April 21, 1931.  E. V. TAYLOR  1,802,126

BRAKE

Filed Dec. 3, 1928

INVENTOR.
Eugene V. Taylor
BY H. O. Clayton
ATTORNEY

Patented Apr. 21, 1931

1,802,126

UNITED STATES PATENT OFFICE

EUGENE V. TAYLOR, OF CHICAGO, ILLINOIS, ASSIGNOR TO BENDIX BRAKE COMPANY, OF SOUTH BEND, INDIANA, A CORPORATION OF ILLINOIS

BRAKE

Application filed December 3, 1928. Serial No. 323,250.

This invention relates to brakes and is illustrated as embodied in an automotive brake of the internal expanding type.

An object of the invention is to provide a simple and efficient control means for the brake shoes or equivalent friction structure whereby a flexible tension element having a translatory movement effects, through the intermediary of means secured to the brake support, a rotary movement to a brake operating element within the support.

In one desirable arrangement there is fixed, to the brake backing plate or equivalent support, a bracket, which bracket houses a non-rotatable sleeve keyed thereto. Within the sleeve there is provided a cam shaft having a threaded engagement therewith. Lineal movement of the non-rotative sleeve, effected by a flexible cable connected thereto is translated into the necessary rotative movement of the cam.

The above and other objects and features of the invention including certain novel constructions, combinations and arrangements of parts will be apparent from the following description of the illustrated embodiment shown in the accompanying drawing, in which.

Figure 1:
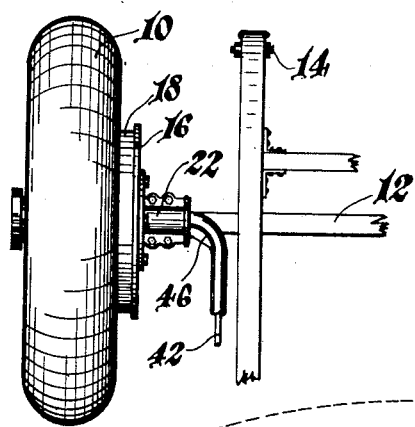
Figure 1 is a partial plan view of an automobile chassis indicating my novel brake control and associated parts.
Figure 3:
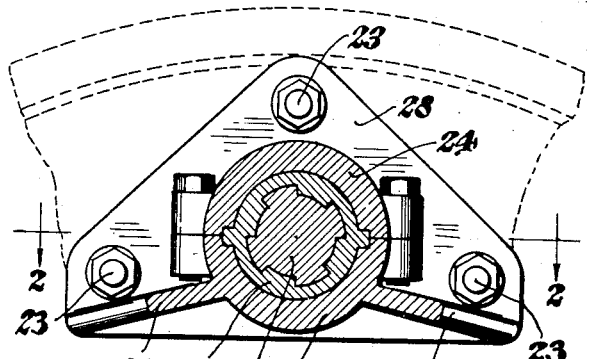
Figure 3 is a section taken through the control structure on the line 3—3 of Figure 2 and showing the supporting bracket in detail.

The preferred form of the invention comprises a vehicle wheel 10 supporting the usual axle structure 12 and springs 14. A brake backing plate or equivalent support 16 houses, together with the usual rotatable brake drum 18, the brake shoes 20 or their equivalent in a friction medium.

Figure 2:
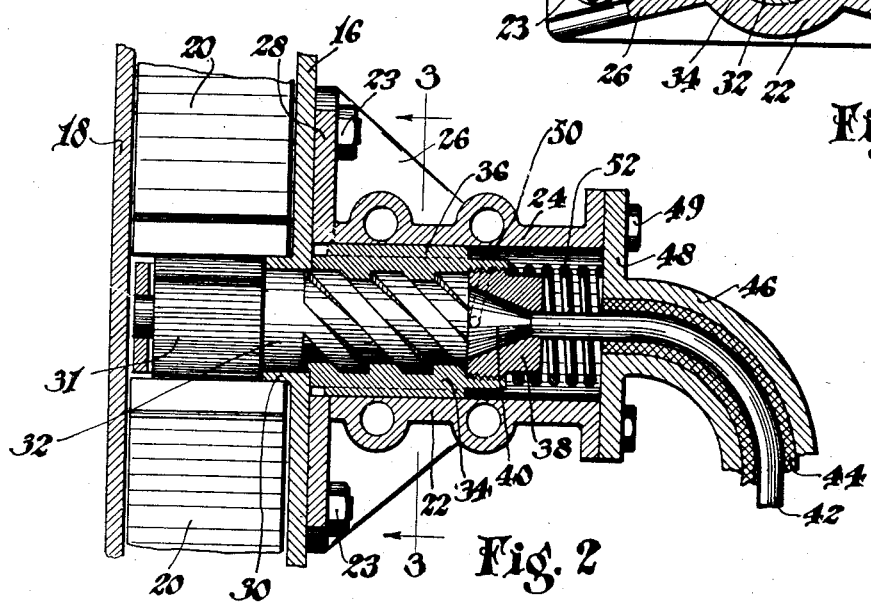
Figure 2 is a sectional view taken on the line 2—2 of Figure 3 showing in detail the control structure.

According to an important feature of my invention there is provided a novel control means for the brake shoes. As clearly illustrated in Figure 2, such structure may comprise a bracket 22 suitably secured to the backing plate as by bolts 23 and having a split boss 24 protruding therefrom, with reinforcing ribs or struts 26 extending between the boss and the triangular end face 28 of the bracket.

The brake support may be flanged at 30 to support a cam 31 whose shaft 32 extends within the aforementioned bracket. In order to effect the necessary rotative movement to the cam to spread the brake shoes apart, I suggest that its shaft 32 be provided with an external square or acme thread meshing with a correspondingly shaped thread on the interior of a sleeve 34 splined to the bracket housing by keys 36. Threaded within one end of the sleeve is an anchor plug 38 having a tapered opening to house a complementary tapered lead anchor 40 secured to one end of a flexible cable 42. The cable extends within a Bowden type conduit 44 which may be supported by a novel curved tubular end member 46 of a bracket 48 suitably secured as by bolts 49 to the end of bracket 22.

A lock ring 50 having ends projecting within the sleeve 34 and plug 38 serves to obviate relative movement between these parts and a compression spring 52, confined between one end of the sleeve and the cable bracket, serves to maintain the parts in working contact as well as to return the mechanism to its inoperative state.

In operation, movement of the cable tensioning element by means of suitable transmission linkage to the service pedal of the car effects a lineal movement of the splined sleeve 34 which in turn rotates the cam by virtue of its threaded connection therewith.

The angle of the thread on the cam shaft may be inclined to suit and thus obtain the desired relative movement of the cable and cam. The return springs within the brake acting on the friction means will serve to rotate the cam to its inoperative position when the brake is released augmented by spring 52.

It is also to be noted that by virtue of the flexibility of the well known cable, and the action of the Bowden conduit, relative movement of the sprung and unsprung parts of the vehicle, also the movement of the control parts when mounted upon a swiveled front wheel, is fully compensated for and has no effect upon the operation of my novel structure.

It will be further appreciated that my novel control member may be employed in various other arts wherein a simple and effective translation of motion is to be effected and further that so far as its applicability to a vehicular braking system is concerned, it may be mounted with equal facility on either front or rear wheels.

While but a single embodiment of my invention has been disclosed and described in detail, it is not my intention to unnecessarily limit its scope thereto or otherwise than by the terms of the appended claims.

I claim:

1. Operating mechanism for a brake for a swiveled wheel having a rotatable brake drum secured thereto, comprising, in combination, a brake support plate mounted for swiveling movement with said wheel, a bracket secured to said plate, non-rotatable means within said bracket constructed and arranged to lend a rotative movement to a cam shaft extending within said non-rotative means, together with a flexible tension element connected to said last-mentioned means to transmit a lineal movement thereto.

2. Operating mechanism for a brake comprising, in combination, a rotative brake operating member, and means to rotate said member including a non-rotatable but lineally movable sleeve having a threaded engagement therewith and a flexible tension element connected to said sleeve.

3. Operating mechanism for a brake comprising, in combination, a rotative brake operating member, and means to rotate said member including a non-rotatable but lineally movable sleeve having a threaded engagement therewith.

4. A brake structure comprising, in combination, a bracket member having a guide slot therein, an internally threaded sleeve within said member and provided with a key to fit said slot, together with a plug threaded into one end of said sleeve, said plug housing the anchor of a flexible tension element.

5. A brake structure comprising, in combination, a bracket member having a guide slot therein, an internally threaded sleeve within said member and provided with a key to fit said slot, together with a plug threaded into one end of said sleeve, said plug housing the anchor of a flexible tension element, and an externally threaded plunger fitting within and threadedly connected to said sleeve.

6. A brake mechanism for a motor vehicle, comprising, in combination, a brake support having a bracket member secured thereto, a non-rotatable member within said bracket and slidable laterally therein, together with a rotatable cam member fitting within and actuated by the lineally movable non-rotatable member.

7. A brake operating mechanism comprising, in combination, a brake backing plate, a control bracket mounted on said plate and housing a sleeve member slidable therein, a rotatable cam-operating member within and actuated by said sleeve, together with a flexible tension element for imparting a lineal movement to the sleeve.

8. A brake operator comprising, in combination, a bracket support having an internally threaded non-rotatable sleeve splined therein and a rotatable externally threaded shaft having a meshing engagement with said sleeve.

9. A brake operator comprising, in combination, a bracket support having an internally threaded non-rotatable sleeve splined therein, a rotatable externally threaded shaft having a meshing engagement with said sleeve and a flexible tension element connected to the sleeve and transmitting a lineal movement thereto.

10. A brake structure comprising a bracket member characterized by a triangularly shaped end plate and a split boss extending from said plate, said boss and plate being connected by reinforcing webs.

11. A brake structure comprising a cable support characterized by a plate member having a relatively short curved tubular housing protruding therefrom and integral therewith.

12. Means for translating lineal into rotary motion comprising, in combination, a housing member, a non-rotatable sleeve splined therein, a rotatable plunger fitting within and threadedly connected to said sleeve, together with a tension element connected to one end of said sleeve and adapted when actuated to give a lineal movement thereto.

In testimony whereof, I have hereunto signed my name.

EUGENE V. TAYLOR.